US009682787B2

(12) United States Patent
Dis et al.

(10) Patent No.: US 9,682,787 B2
(45) Date of Patent: Jun. 20, 2017

(54) PROTECTIVE COVER FOR A PITOT PROBE

(71) Applicant: Serias Design LLC, The Villages, FL (US)

(72) Inventors: James Van Dis, Washington, NC (US); Ernest Jefferson, Bath, NC (US)

(73) Assignee: SERIAS DESIGN LLC, Lecanto, FL (US)

( * ) Notice: Subject to any disclaimer, the term of this patent is extended or adjusted under 35 U.S.C. 154(b) by 953 days.

(21) Appl. No.: 14/013,393

(22) Filed: Aug. 29, 2013

(65) Prior Publication Data

US 2015/0059939 A1    Mar. 5, 2015

(51) Int. Cl.
*G01D 11/24* (2006.01)
*B64F 1/00* (2006.01)

(52) U.S. Cl.
CPC .................................. *B64F 1/005* (2013.01)

(58) Field of Classification Search
CPC ................................ G01D 11/24; B66F 1/005
USPC ...................... 73/431, 273; 244/1 R; 150/154
See application file for complete search history.

(56) References Cited

U.S. PATENT DOCUMENTS

| 6,901,793 B1 * | 6/2005 | Jefferson | G01P 5/165 |
| | | | 150/154 |
| 8,517,301 B1 * | 8/2013 | Jefferson | B64C 25/28 |
| | | | 150/154 |
| 9,174,743 B2 * | 11/2015 | Dis | B64D 45/00 |

* cited by examiner

*Primary Examiner* — Lisa Caputo
*Assistant Examiner* — Jamel Williams
(74) *Attorney, Agent, or Firm* — Vorys, Sater, Seymour and Pease LLP

(57) ABSTRACT

A protective cover mountable on a pitot prob disposed on the fuselage of an idle aircraft adapted to be tailored to similar covers mountable on other probes of such aircraft, including a tubular body of a braided fabric material provided with a recess therein for receiving the leading end of a pitot tube therein, a first annular member disposed in such recess adjacent an open end thereof having a portion of the tubular body projecting therethrough, including such member therein and a second annular member disposed substantially coaxially with such first annular member and secured to such tubular body of braided fabric material, having at least one tab provided on the exterior thereof provided with means to tether such cover to similar covers.

20 Claims, 2 Drawing Sheets

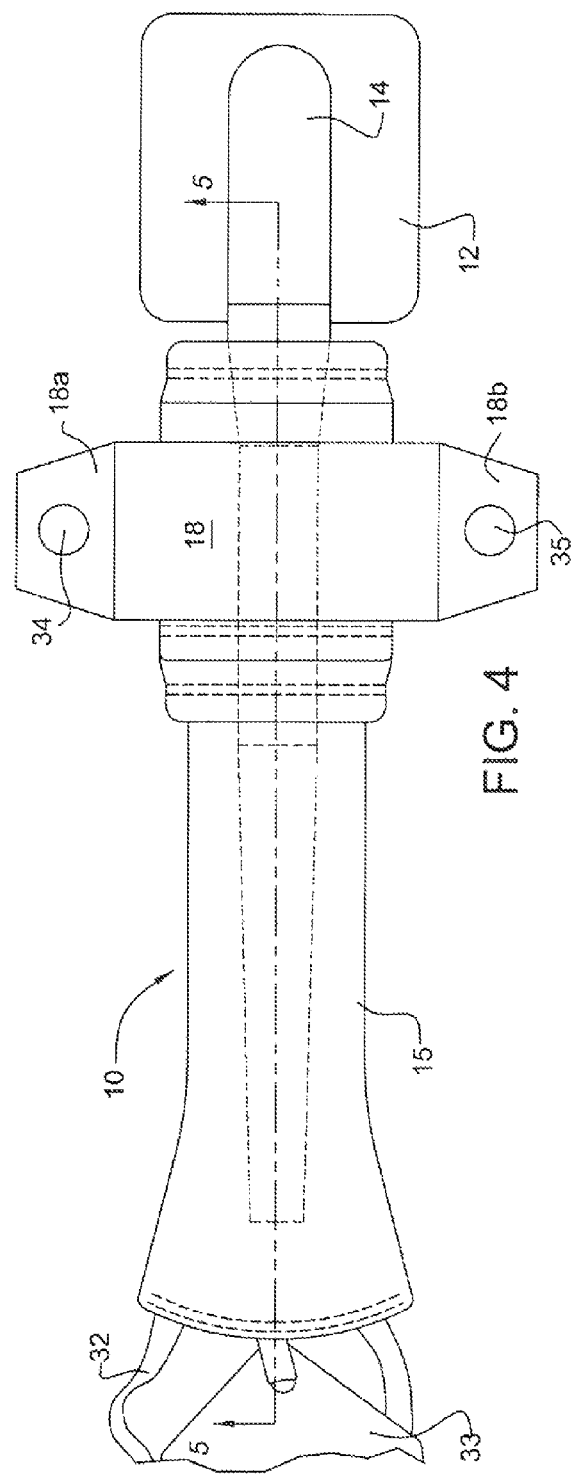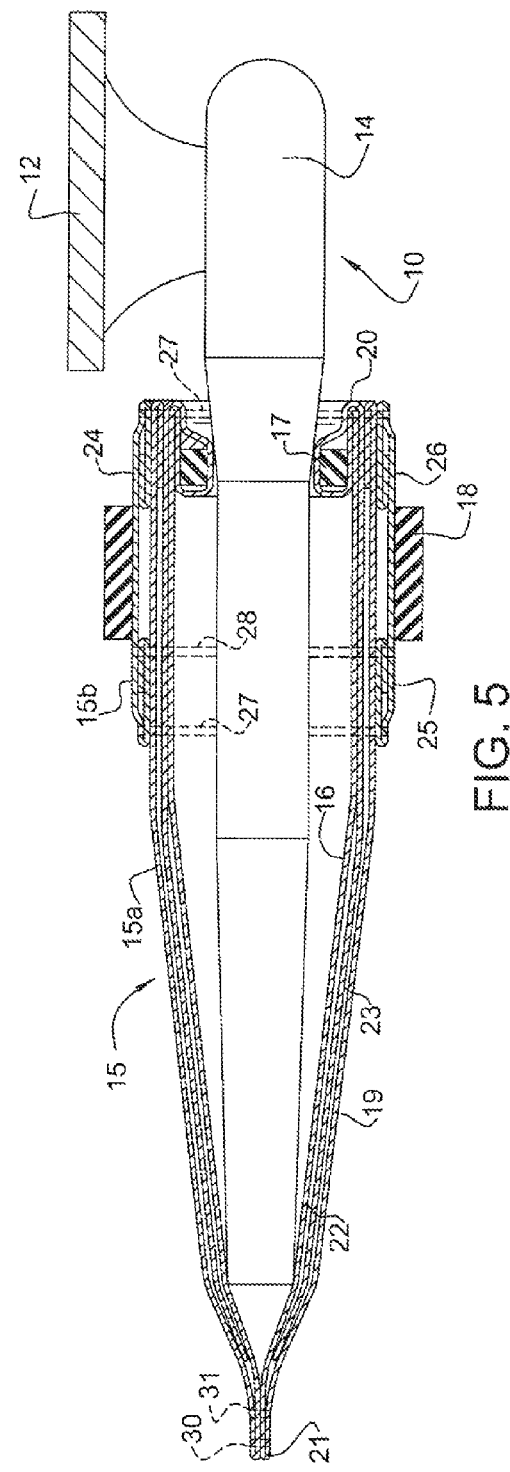

PROTECTIVE COVER FOR A PITOT PROBE

The present invention relates to a protective cover for a pitot probe mounted on the fuselage of a parked aircraft, and more particularly to such a cover which may be tethered with similar covers and applied to a number of probes.

BACKGROUND OF THE INVENTION

In the prior art, there have been developed a number of covers which are adapted to be applied by ground personnel to pitot probes provided on parked aircraft. Typically, such probes are mounted on the front end sides of the fuselage of an aircraft and may consist of multiple probes disposed on both sides of the fuselage. When multiple probes are involved on both sides of the fuselage, the individual covers of such probes often are tethered together to facilitate their installation and removal. In circumstances where such multiple probes are mounted at heights unreachable by service personnel on ground level, various extension devices such as poles and rods may be used by such personnel to lift, position and mount tethered sets of such covers. Where multiple probes are involved that can be reached by ground personnel, tethered covers for such probes may be positioned and installed without the need of extension devices. In such circumstances, however, it has been found that the provisions of such covers must be suitable to readily tether such covers together and readily manually lift, install and remove such tethered sets of covers. Accordingly, it is the principal object of the present invention to provide a probe cover which may be tethered together with a set of similar probes, which tethered probes may be readily manually lifted, applied and removed from a set of low-lying probes on the fuselage of an aircraft.

SUMMARY OF THE INVENTION

The principal object of the present invention is achieved by providing a protective cover mountable on a pitot probe disposed on the fuselage of a parked aircraft, adapted to be tethered to similar covers mountable on other probes of such aircraft comprising a tubular body of a braided fabric material having a closed end, an open end providing a recess therein for receiving the leading end of a pitot probe; a first annular member disposed in the recess adjacent such open end, having a portion of such tubular body projecting therethrough, embedding such member therein; and a second annular member disposed substantially coaxially relative to such first annular member and secured to such tubular body of braided fabric material, having at least one tab disposed on the exterior thereof provided with means to tether said cover to similar covers. Preferably, such tubular member is formed of a high temperature, flame retardant material, such first annular member comprises an o-ring formed of an elastomeric material providing an interference fit with a pitot probe received in such recess, such second annular member is formed of a silicon rubber material adhesively secured to such tubular member and the tab of such second annular member projects radially relative to a centerline of such cover and is provided with an opening therethrough for receiving and attaching a cord for tethering such cover to similar covers.

BRIEF DESCRIPTION OF THE DRAWINGS

FIG. 4 is an enlarged, top plan view of the probe cover shown in FIG. 3; and

FIG. 5 is cross-sectional view taken along line 5-5 in FIG. 4.

DETAILED DESCRIPTION OF PREFERRED EMBODIMENT OF THE INVENTION

Figure 1:
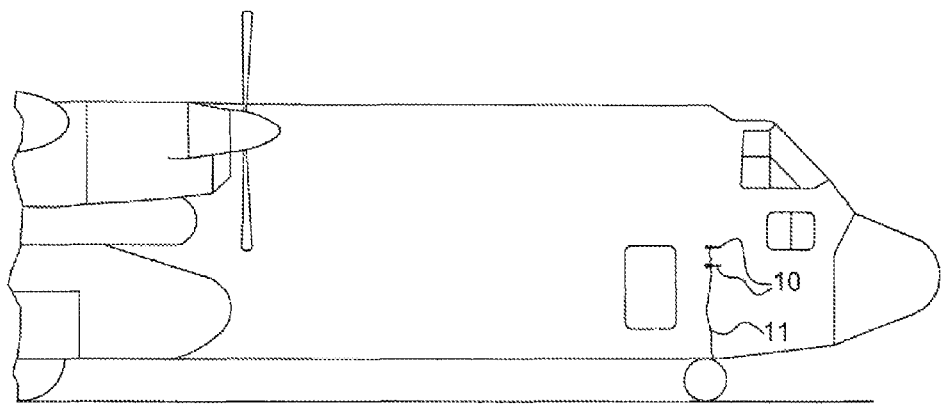
FIG. 1 is a partial, side elevational view of an aircraft having mounted on the fuselage thereof, several pilot probes reachable by ground personnel, on which protective covers embodying the present invention are mountable.
Figure 2:
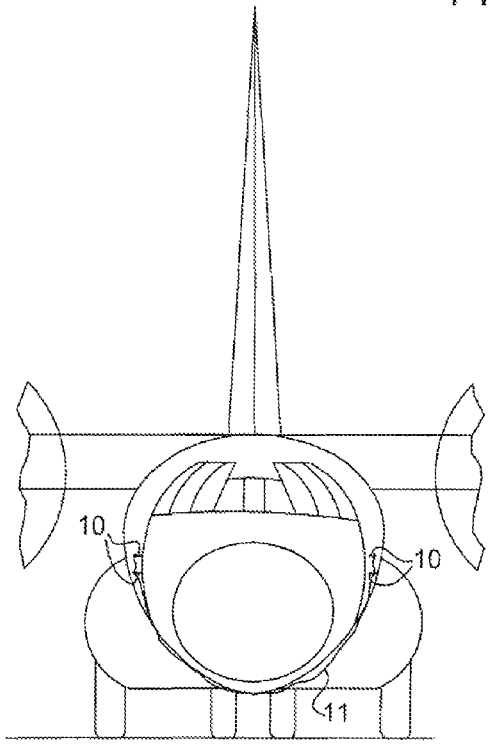
FIG. 2 is a partial, front elevational view of the aircraft shown in FIG. 1, having portions thereof broken away, further illustrating the positions of several probes according to the present invention, tethered together and mounted on the front end sides of the aircraft.
Figure 3:
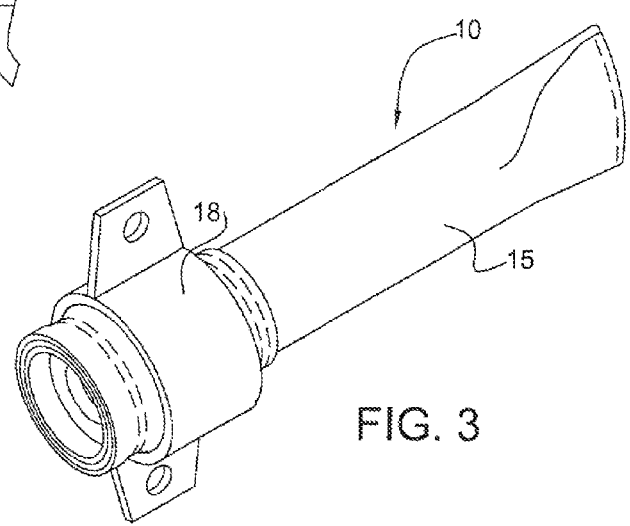
FIG. 3 is an enlarged perspective view of a pitot probe cover embodying the present invention.

Referring to FIGS. 1 and 2 of the drawings, there is illustrated an aircraft parked on the ground on which there is provided different sets of probes mounted on the sides of the fuselage thereof which are required to be provided with protective covers while the aircraft is idled. In this particular aircraft, such probes are disposed at heights reachable by ground personnel seeking to apply protective covers thereon. Applied to each of such probes is a protective cover 10 tethered to similar covers on other probes by means of a line 11. As best shown in FIGS. 4 and 5, each of such probes includes a base portion 12 mounted on and secured to the fuselage of the aircraft, a support stand portion 13 formed integrally with base portion 12 and a tubular portion 14 having an end thereof formed integrally with an end of stand portion 13. Tube portion 14 is disposed parallel with the centerline of the aircraft with an inlet port at a forward end thereof, and a longitudinal passageway provided with pressure sensors. The sensors disposed in the passageway of portion 14 sense air pressure during the aircraft in flight and are operatively connected to instrumentation in the aircraft which is functional to process data received from the sensors of the probes and display velocity and altitude data in such instrument panel in the cockpit of the aircraft, during flight. Each protective cover 10 is intended to shield a probe on which it is applied from impact, contaminants and harsh temperatures while the aircraft is out of commission, parked on the ground. As shown in FIGS. 3 through 5, it includes a flexible tubular member 15 closed at one end and open at the other end to provide an elongated recess 16 intended to receive the free end of tube portion 14 of a probe when applied thereon, a first annular member 17 disposed within recess 16 adjacent the open end thereof and embedded within a ply of flexible tubular member 15, and a second tubular member 18 disposed about the exterior of the tubular member.

Flexible tubular member 15 is formed of a first tubular member 15*a* and a second tubular member 15*b*, each formed of a high temperature, flame retardant material formed of braided para-aramid fibers. Member 15*a* includes an outer ply segment 19 hemmed at an entry end as at 20 and inverted at an opposite end as at 21, an inner ply 22 defining recess 16, wrapped around and through inner annual member 17, embedding such member, and an intermediate ply segment 23 disposed between inner and outer ply segments 19 and 22. Member 15*b* includes a ply portion 24 overlying an end portion of outer ply segment 19, provided with hemmed portions 25 and 26. The ends of ply 24 are secured to layered portions of ply segments 19, 22 and 25 by means of stitches 27, 28 and 29 consisting of glass threads. Similarly, the closed end of member 15 is flattened and stitched together by a similar set of threads 30 and 31. A looped member 32 which may be gripped and pulled to remove the cover from a probe, and a tag 33 provided with script cautioning removal of the cover upon the aircraft intended to becoming airborne, also may be secured between the end portion of member 15 as shown in FIG. 5.

Inner annular member 17 is formed of an elastomeric material, preferably a silicone rubber, and is provided with an inner diameter sufficient to slightly grip a portion of the tubular portion 14 of the probe when the cover is applied to a probe, providing an interference fit relative to the inserted probe. In circumstances where the tubular portion of a probe is provided with a frusto-conical surface as shown in FIG. 5, the position of annular member 17 is arranged so that annular member 17 through the fabric material layer engages such surface to provide an interference fit. Outer annular member 18 includes an annular portion 18a provided with radially projecting ear or tab portions 18b and 18c. Such ear or tab portions further are provided with openings 34 and 35 to which a lanyard may be secured to tether a number of such covers together as shown in FIGS. 1 and 2, facilitating the application, removal and handling of a number of tethered covers. Outer annular member 18 also is formed of an elastomeric material, preferably a silicon, rubber, adhesively secured to ply segment 24.

The cover as described may be produced by inverting and thus forming a tube of fabric material to form the several ply segments essentially as shown in FIG. 5, with inner tubular member 17 being inserted within a portion of ply 22, inverting the embedded inner annular member 17 into recess 16 into the position shown in FIG. 5, applying second tubular member 15b on the leading end of first annular member 15a and stitching the tubular members together. An annular form is then inserted through the free open end of the tubular body to provide a support for the portion of the tubular member upon which annular member 18 is to be mounted and secured. Upon positioning such form, a liquid form of a rubber compound is infused into the outer layer of the fabric material of the formed member, about the area coinciding with tubular member 17, in sufficient depth to intersperse within the voids of the fabric. Next the infused member is placed in a mold provided with an internal configuration in the shape of tubular member 18. The mold then is injected with additional rubber compound and heated, and the heated mold is placed in an oven to further heat and cure the rubber component so that member 18 is formed, encapsulating the fabric member. Upon completion of the molding procedure, the form is removed and the free open end of the tubular fabric member is stitched together to close such end. In the course of doing so, end portions of loop 32 and tag 34 are inserted between ply segments of such members to secure such appendages to the cover.

In the use of the cover as described, a number of such covers are tethered together by means of a lanyard. With a probe arrangement as shown in FIGS. 1 and 2, with pitot probes mounted on both sides of the fuselage at heights reachable by personnel standing at ground level, the tethered covers may be applied manually simply by reaching up and applying a first set of covers on the set of probes on one side of the fuselage, simply by slipping them on, guiding the lanyard under and around the fuselage to the other side thereof, again reaching up and applying a second set of tethered covers on the other set of probes on such other side of the fuselage. When the aircraft is to become airborne, the message on tag 33 attached to each cover serves to alert ground personnel to remove the covers mounted on the probes to permit them to function in their intended matter once the aircraft is airborne. Such reminder text would thus cause such ground personnel to reach up, grip and pull loops 32 of each cover to remove the tethered covers and allow them to be stowed away for further usage.

The invention as described provides a simple and effective cover that may be easily tethered with similar covers and applied, removed and stowed manually by ground personnel in circumstances in which the probes to be covered can be reached by such personnel without the need spanning devices.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

We claim:

1. A protective cover mountable on a pitot probe disposed on the fuselage of an idle aircraft, adapted to be tethered to similar covers mountable on other probes of said aircraft, comprising:
   a tubular body of a braided fabric material provided with recess therein for receiving the leading end of a pitot probe therein;
   a first annular member disposed in said recess adjacent an open end thereof, having a portion of said tubular body projecting therethrough, including said first annular member therein; and
   a second annular member disposed substantially coaxially relative to said first annular member and secured to said tubular body of braided fabric material, having at least one tab provided on the exterior thereof provided with means to tether such cover to similar covers.

2. The cover of claim 1 wherein said tubular member is formed of a high temperature, flame retardant material.

3. The cover of claim 1 wherein said tubular member is formed of braided glass fiber threads.

4. The cover of claim 1 wherein said tubular member is formed of braided para-aramid fibers.

5. The cover of claim 1 wherein said first annular member is formed of a material providing an interference fit with a probe inserted therein.

6. The cover of claim 5 wherein said first annular member comprises an o-ring formed of an elastomeric material.

7. The cover of claim 1 wherein said second annular member is encapsulated on said tubular member.

8. The cover of claim 1 wherein said second annular member is formed of a silicone rubber material.

9. The cover of claim 1 wherein said tab projects radially relative to a centerline of said second annular member.

10. The cover of claim 9 wherein said tab is provided with an opening for receiving therethrough and attaching a cord.

11. The cover of claim 1 including a pair of tabs provided on said second annular member, projecting laterally and lying in a plane including the axis of said second annular member.

12. The cover of claim 11 wherein each of said tabs is provided with an opening therethrough through which a cord may extend and be secured thereto.

13. The cover of claim 1 wherein the ends of said tubular member are hemmed and stitched together, precluding exposure of frayed ends thereof.

14. The cover of claim 1 wherein one end of said tubular member is hemmed, flattened and stitched together to form said closed end.

15. The cover of claim 14 including a chord having the ends thereof received between hemmed portions of said tubular members stitched together, forming a loop which may be grasped and pulled for removing said cover mounted on a probe.

16. The cover of claim 7 wherein said second annular member is formed by infusing a liquid form of a liquid rubber component into an outer layer of said tubular body of braided fabric material, about the area thereof coinciding with said first annular member, in sufficient depth to infuse within the voids of said fabric material, placing said infused tubular body in a mold provided with an internal configuration in the shape of said second annular member, injecting additional liquid rubber compound into said mold in contact with said fused component, heating said mold and then heating said component to cure it and correspondingly form said second member encapsulating said tubular body of braided fabric material.

17. The cover of claim 16 wherein said tubular member is formed of braided glass fibers.

18. The cover of claim 16 wherein said tubular member is formed of braided para-aramid fibers.

19. The cover of claim 16 wherein said rubber compound comprises a silicone rubber material.

20. A protective cover mountable on a pitot probe disposed on the fuselage of an idle aircraft, adapted to be tethered to similar covers mountable on other probes of said aircraft, comprising:

a tubular body of a braided fabric material provided with recess therein for receiving the leading end of a pitot probe therein;

a first annular member disposed in said recess adjacent an open end thereof, having a portion of said tubular body projecting therethrough, including said first annular member therein; and a second annular member disposed substantially coaxially relative to said first annular member and secured to said tubular body of braided fabric material, comprising a pair of tabs provided on said second annular member, projecting laterally and lying in a plane including the axis of said second annular member;

wherein each said tab projects radially relative to a centerline of said second annular member, wherein the tabs are integral to the second annular member on opposed sides of the exterior of the second annular member, wherein each of said tabs is provided with an opening therethrough through which a cord may extend and be secured thereto;

wherein said first annular member comprises an o-ring formed of an elastomeric material;

wherein said second annular member is formed of a silicone rubber material.

* * * * *